(12) United States Patent
Gough et al.

(10) Patent No.: US 9,550,168 B2
(45) Date of Patent: Jan. 24, 2017

(54) PROGRAMMABLE PH BUFFERS

(71) Applicant: Sandia Corporation, Albuquerque, NM (US)

(72) Inventors: Dara Van Gough, Albuquerque, NM (US); Dale L. Huber, Albuquerque, NM (US); Bruce C. Bunker, Albuquerque, NM (US); Mark E. Roberts, Clemson, SC (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/864,637

(22) Filed: Sep. 24, 2015

(65) Prior Publication Data

US 2016/0030920 A1 Feb. 4, 2016

Related U.S. Application Data

(62) Division of application No. 13/455,946, filed on Apr. 25, 2012, now abandoned.

(51) Int. Cl.
*B01J 20/26* (2006.01)

(52) U.S. Cl.
CPC .............. *B01J 20/264* (2013.01); *Y02C 10/08* (2013.01)

(58) Field of Classification Search
CPC ................................ B01J 20/264; Y02C 10/08
USPC ......................................................... 252/189
See application file for complete search history.

(56) References Cited

U.S. PATENT DOCUMENTS

| 7,422,724 B1 | 9/2008 | Manginell et al. |
| 2005/0025741 A1 | 2/2005 | Lau |

OTHER PUBLICATIONS

Huang, et al., Controlled drug release from hydrogel nanoparticle networks, Journal of Controlled Release 2004; 94: 303-311.*
B.C. Bunker, et al., Ceramic Thin-Film Formation on Functionalized Interfaces Through Biomimetic Processing, Science, vol. 264, Apr. 1, 1994, pp. 48-55.
J.P. Ciferno, et al., DOE/NETL Carbon Dioxide Capture and Storage RD&D Roadmap, National Energy Technology Laboratory, Dec. 2010.
D.A. Palmer, et al., The Chemistry of Metal Carbonato and Carbon Dioxide Complexes, Chem. Rev. 1983, vol. 83, pp. 651-731.
D.L. Huber, et al., Programmed Adsorption and Release of Proteins in a Microfluidic Device, Science, vol. 301, Jul. 18, 2003, pp. 352-354.
D.W. Urry, et al., Design at Nanometric Dimensions to Enhance Hydrophobicity-Induced pKa Shifts, J. Am. Chem. Soc. vol. 114, 1992, pp. 8716-8717.

(Continued)

*Primary Examiner* — Daniel C McCracken
(74) *Attorney, Agent, or Firm* — Kevin W. Bieg

(57) ABSTRACT

A programmable pH buffer comprises a copolymer that changes $pK_a$ at a lower critical solution temperature (LCST) in water. The copolymer comprises a thermally programmable polymer that undergoes a hydrophobic-to-hydrophilic phase change at the LCST and an electrolytic polymer that exhibits acid-base properties that are responsive to the phase change. The programmable pH buffer can be used to sequester $CO_2$ into water.

13 Claims, 10 Drawing Sheets

(56) References Cited

OTHER PUBLICATIONS

D.W. Urry, Molecular Machines: How Motion and Other Functions of Living Organisms Can Result from Reversible Chemical Changes, Angew. Chem. Int. Ed. Engl., vol. 32, 1993, pp. 819-841.

I.Noda, et al., Thermodynamic Properties of Moderately Concentrated Solutions of Linear Polymers, Macromolecules 1981, vol. 14, pp. 668-676.

J-C. Kim, et al., Temperature-Sensitivity of Liposomal Lipid Bilayers Mixed with Poly(N-Isopropylacrylamide-co-acrylic Acid), J. Biochem., vol. 121, No. 1, 1997, pp. 15-19.

Liu, P. et al., Drug release kinetics from monolayer films of glucose-sensitive microgel, Polymer, vol. 51, 2010, pp. 2668-2775.

* cited by examiner

PROGRAMMABLE pH BUFFERS

CROSS-REFERENCE TO RELATED APPLICATION

This is a divisional application of application Ser. No. 13/455,946, filed Apr. 25, 2012, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to pH buffers and, in particular, to thermally programmable pH buffers that can be used for reversible $CO_2$ sequestration into water.

BACKGROUND OF THE INVENTION

A wide range of reactions that occur in aqueous solution are heavily dependent on the concentrations of available protons or hydroxide ions. The ability to control solution pH, where pH=−log $[H_3O+]$, is required for many reactions in biochemistry, synthesis and processing, and colloid chemistry, as well as for a myriad of technological processes that are performed in water. As many of the reactions of interest consume or release either protons or hydroxide ions, reagents that can buffer the solution pH to specific values are often required. When a given process or reaction only requires a single pH value, standard pH buffers are adequate. However, some processes require the ability to switch from one pH to another. One example of such a process is precipitation, where a homogeneous pH change is required to move from a regime in which precursors are soluble into a regime where the solution is supersaturated and nucleation and growth can occur. See B. C. Bunker et al., *Science* 264 (5155), 48 (1994).

A specific example in which reversible and programmed pH changes can be a powerful tool involves the reversible sequestration of $CO_2$ from the atmosphere. The U.S. Department of Energy has set a goal for removing over one billion metric tons per year of $CO_2$ from air and/or the effluent of coal fired power plants. One inexpensive mechanism for achieving this goal is to program water to reversibly capture and release the $CO_2$. As shown in FIG. 1, capture can be achieved at high pH by converting relatively insoluble $CO_2$ into the highly soluble anionic bicarbonate ion (up to a theoretical limit of 11 M). See D. A. Palmer and R. Vaneldik, *Chemical Reviews* 83 (6), 651 (1983). Conversely, release is promoted by switching back to low pH, which converts the soluble bicarbonates back to insoluble $CO_2$ gas. While such pH changes could be achieved by cycling between additions of strong acids and bases to the solution, it would be more efficient to have a programmable pH buffer in the system as a reservoir for reversibly adding or removing either protons or hydroxide ions without the need to continuously add and consume external reagents.

SUMMARY OF THE INVENTION

The present invention is directed to a programmable pH buffer comprising a copolymer that changes $pK_a$ at a lower critical solution temperature in water, wherein the copolymer comprises a thermally programmable polymer that undergoes a hydrophobic-to-hydrophilic phase change at the lower critical solution temperature and an electrolytic polymer that exhibits acid-base properties that are responsive to the phase change. The thermally programmable polymer can be hydrophilic below the lower critical solution temperature and hydrophobic above the lower critical solution temperature. For example, the thermally programmable polymer can comprise poly(N-isopropylacrylamide), poly(N-ethylacrylamide), or poly(N,N-dimethylacrylamide). The copolymer can change from a low $pK_a$ in water below the lower critical solution temperature to a high $pK_a$ in water above the lower critical solution temperature. For example, the electrolytic polymer can comprise an acid, such as acrylic acid. The acrylic acid comprises a carboxylic acid group that captures $CO_2(g)$ from water above the lower critical solution temperature by converting carbonic acid ($H_2CO_3$) to bicarbonate anion ($HCO_3^-$). Alternatively, the programmable pH buffer can comprise a copolymer that changes from a high $pK_a$ in water below the lower critical solution temperature to a low $pK_a$ in water above the lower critical solution temperature. For example, the electrolytic polymer can comprise an amine, preferably a primary amine. The primary amine can comprise N-(3-aminopropyl)methacrylamide hydrochloride. The copolymer can further comprise a hydrophobic monomer, such as methylmethacrylate, styrene, or n-butyl acrylate.

The invention is further directed to a method for $CO_2$ sequestration into water, comprising dissolving a programmable pH buffer in water, wherein the programmable pH buffer comprises a copolymer that changes $pK_a$ at a lower critical solution temperature in water, wherein the copolymer comprises a thermally programmable polymer that undergoes a hydrophobic-to-hydrophilic phase change at the lower critical temperature and an electrolytic polymer that exhibits acid-base properties that are responsive to the phase change, and heating the aqueous solution above the lower critical solution temperature whereby the copolymer exchanges $CO_2$ into the water. The copolymer can change from a low $pK_a$ in water below the lower critical solution temperature to a high $pK_a$ in water above the lower critical solution temperature, thereby capturing $CO_2$ from water upon heating the aqueous solution above the lower critical solution temperature. For reversible $CO_2$ sequestration, the method can further comprise cooling the aqueous solution below the lower critical solution temperature, whereby the copolymer releases $CO_2$ into water. Alternatively, the copolymer can change from a high $pK_a$ in water below the lower critical solution temperature to a low $pK_a$ in water above the lower critical solution temperature, thereby releasing $CO_2$ into water upon heating the aqueous solution above the lower critical solution temperature and capturing $CO_2$ from water upon cooling the aqueous solution below the lower critical solution temperature. For $CO_2$ sequestration, the lower critical solution temperature is preferably greater than 20° C. and less than 50° C. and the buffer capacity is greater than 1 mM in aqueous solution.

An exemplary copolymer based approach utilizes the incorporation of carboxylic acid groups within the polymer poly(N-isopropylacrylacrylamide (PNIPAM) was investigated as a model system for thermally programmable pH buffers. The exemplary buffer system relies on a phase transition based on a lower critical solution temperature to change the local environment around ionizable acid groups from a hydrophilic to a hydrophobic state. Results show that this phase transition is capable of changing $pK_a$ values for the tethered acid groups by over five units, from 5.1 to 10.4. However, deprotonation of tethered acid sites has been found to increase the transition temperature and decrease the extent to which $pK_a$ values can be changed. These changes are a direct result of the fact that the anionic sites resulting from deprotonation of polymer-bound acids are hydrophilic, suppressing the hydrophobicity of the polymer above the transition temperature. Compositional changes can compensate for the adverse effects induced by anion content for LCST polymers used in applications requiring both high buffer capacities and reversibility. These changes include altering the ratio of acid groups to NIPAM groups with the copolymer, incorporation of amine-based functionality in place of acid groups, and copolymerization with hydrophobic monomers.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Many reactions in both chemistry and biology rely on the ability to precisely control and fix the solution concentrations of either protons or hydroxide ions. Mixtures of acids and their conjugate anions represent the classical chemical systems that are used to buffer the acidity of aqueous solutions to a specific pH value. The present invention is directed to programmable pH buffer systems based on the attachment of electrolytic groups to polymers that exhibit a lower critical solution temperature (LCST).

An embodiment of the present invention comprises a copolymer of N-isopropylacrylamide (NIPAM) and acrylic acid (AA). As this polymer undergoes a thermally activated phase transition, the local environment around the acid groups can be switched between hydrophilic and hydrophobic states. At room temperature, PNIPAM is water soluble, highly swollen, and hydrophilic. At the lower critical solution temperature (LOST) of around 30° C., this polymer undergoes a phase transition to produce a polymer that collapses, is hydrophobic, and becomes significantly less water-soluble. Previously, the PNIPAM phase transition has been utilized for processes such as the reversible capture and release of proteins in microfluidic devices. See D. L. Huber et al., Science 301 (5631), 352 (2003); and U.S. Pat. No. 7,422,724 to Manginell et al. The phase transition is capable of changing dissociation constants for the tethered acid groups by over five orders of magnitude through moderate temperature variations. The nature of the transition and its impact on $pK_a$ values is highly dependant on the degree of ionization of the polymer. In particular, polymer composition and ionization affects the transition temperature, the magnitude of $pK_a$ changes, and the ion exchange capacity of the buffer. The programmable pH buffer system can be used for reversible $CO_2$ sequestration in water.

Figure 1:
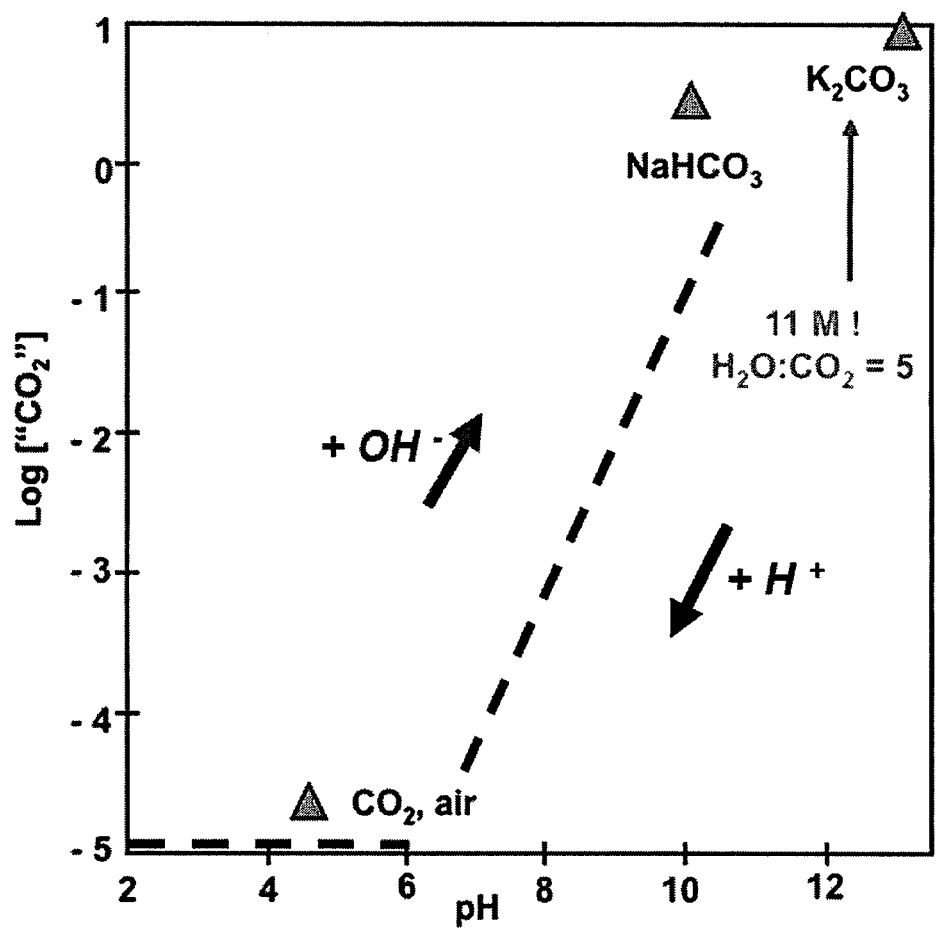
FIG. 1 shows a graph of the interconversion of highly soluble carbonates to relatively insoluble $CO_2$ based on pH of water.
Figure 2:
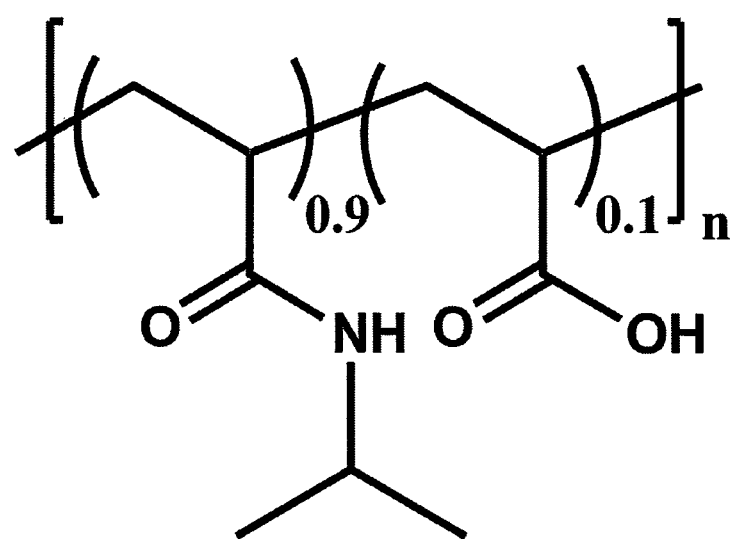
FIG. 2 shows the chemical structure of one programmable pH buffer P(NIPAM-AA) comprised of a random mixture of 90 mole % of N-isopropylacrylamide and 10 mole % acrylic acid.
Figure 3:
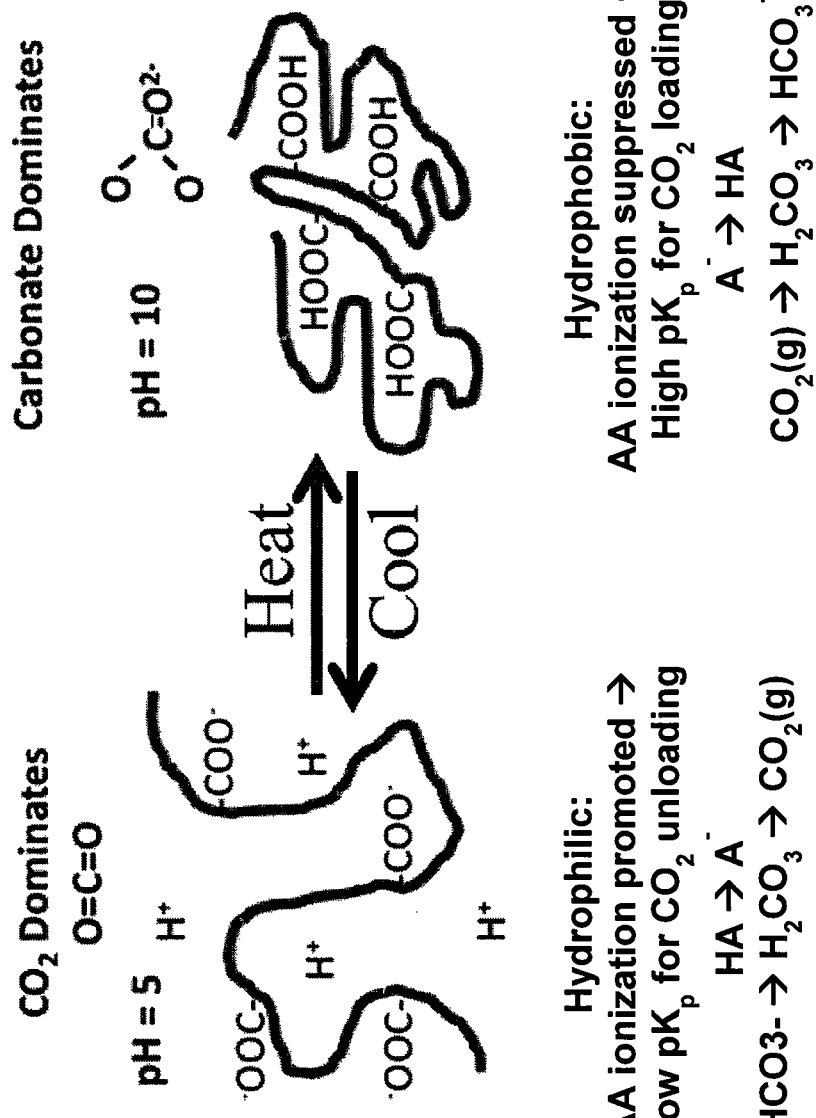
FIG. 3 shows the predicted $CO_2$ capture behavior of a polymer.

An exemplary buffer system is based on the introduction of acidic or basic groups into a thermally-programmable polymer poly(N-isopropylacrylamide) or PNIPAM. An exemplary thermally programmable pH buffer comprises a copolymer containing 10 mole % of acrylic acid (AA) and 90 mole % NIPAM. This exemplary model polymer, shown in FIG. 2, is referred to herein as P(NIPAM-AA). As shown in FIG. 3, the mechanism by which the P(NIPAM-AA) buffer system works relies on switching the hydrophilic-to-hydrophobic character of the environment within which the carboxylic acid groups in P(NIPAM-AA) reside. Below the PNIPAM transition temperature, the polymer-bound AA groups reside in a water-rich, hydrophilic environment. In this environment, these AA groups exhibit acid-base properties that are similar to those exhibited by carboxylic acids dissolved in water, with a $pK_a$ of around 5:

$$HA \rightleftarrows H^+ + A^- : \quad [1]$$

$$pK_a = -\log K_a$$

$$pH = -\log[H^+]$$

Here, HA represents a protonated AA group, while A$^-$ is the deprotonated form. Above the thermally-activated LOST phase transition, the AA component finds itself in a hydrophobic environment that tends to suppress the ionization process associated with dissociation of protons from the AA. This suppression is reflected in a dramatic increase in the $pK_a$ of the AA group. Work reported previously on polypeptides based on the protein elastin suggests that $pK_a$ changes of over 5 units are readily achievable. See D. W. Urry et al., *J Am Chem Soc* 114 (22), 8716 (1992). Therefore, since the properties of a buffer (Eq. 1,2) are controlled by the $pK_a$, the equivalents of acid sites present ([HA], in moles/liter), and the extent of polymer ionization ([HA]/[A$^-$]), when P(NIPAM-AA) is present, temperature can be used to program the solution pH based on $pK_a$ values established above and below the transition temperature.

Properties of interest for programmable pH buffers include: 1) the capacity of the buffer, which is controlled by the number of equivalents of polymer-bound acid groups that can be dissolved in, or exposed to the solution, 2) the transition temperature at which switching occurs, which is controlled via polymer composition and can be tuned through the entire liquid range of water, 3) the change in $pK_a$ that is achievable on switching, which is determined by the extent to which the hydrophobicity of the local environment changes above the transition temperature, and 4) the midpoint of the $pK_a$ window, which depends on both the $pK_a$ of the acid-base groups attached to the polymer and the nature of the polymer. See D. W. Urry, *Angew Chem Int Edit* 32 (6), 819 (1993). In principle, it should be possible to create a programmable pH buffer to meet almost any application, as it is known that the switching temperature, the $pK_a$ range, and the $pK_a$ midpoint can be controlled over wide ranges via the polymer composition. In practice, the properties of the buffer can be optimized, since compositional changes that mediate one property affect all properties.

Described below are the properties associated with the exemplary programmable pH buffer consisting of 90 mole % NIPAM and 10 mole % AA. Studies on this polymer illustrate the use of thermally-programmable polymers to generally control solution pH. By varying the relative ratios of the protonated and anionic forms of the PAA (i.e., [HA] and [A$^-$]), different polymer properties can be varied as a function of polymer composition and/or buffer capacity. In particular, thermally programmable pH buffers allow for significant and reversible programming of solution pH.

Synthesis of the Exemplary Polymer

A P(NIPAM-AA) copolymer comprised of 90 mole % NIPAM and 10 mole % AA was prepared using a standard free radical polymerization. NIPAM was recrystallized from hexane, while all other reagents were used as received. The monomers, N-isopropylacrylamide (18.3 g, 162 mmole) and acrylic acid (1.3 g, 18 mmol) were dissolved in 200 ml of THF to which the radical initiator AIBN (0.3 g, 1.8 mmol) was added. Under a nitrogen atmosphere, the reaction mixture was vigorously stirred and heated to 60° C. for 4 hours. The reaction was cooled and the solvent was evaporated. The recovered solid was dissolved in 400 mL of water, filtered, and then heated to boiling. A hot gravity filtration was performed to collect the precipitated polymer.

Characterization of the Exemplary Polymer

The molecular weight of the polymer was determined using gel permeation chromatography (GPC) in THF solutions following a dissolution and equilibration period of four hours. The molecular weight is reported as a polystyrene equivalent weight and must be taken as approximate. The composition of the polymer dissolved in DMSO was determined using nuclear magnetic resonance (NMR) spectroscopy. Polymer titrations to determine the moles of acid equivalents present per unit mass were performed. The pH meter was calibrated using standard IUPAC buffer solutions of pH 4, 7, and 10. End point titrations were performed in water using 0.1 M NaOH to a final pH of 9 or 10. Titrant additions were controlled using software.

Programmable pH Buffer Experiments

Polymer solutions were prepared by dissolving P(NIPAM-AA) overnight in deionized water. The standard solution concentration was 1 wt % (or $10^{-2}$ M in acrylic acid groups), although measurements at 5 wt % were also performed. The temperature was controlled using a standard hot plate, and both the temperature and pH were recorded simultaneously using software. The inverse transition temperature of the polymer was determined by slowly heating an aqueous polymer solution from room temperature to 70° C. at a rate of 5° C./min. The temperature at which the clear polymer solution became opaque due to polymer precipitation (i.e., the cloud point) was noted. Conversely, the temperature at which the solution clarified on cooling was also noted.

Buffer Equivalents and Capacity

As described above, the exemplary programmable pH buffer was a copolymer containing 90 mole % of NIPAM and 10 mole % AA that was synthesized via free radical polymerization. The PNIPAM "host polymer" was used to provide thermal programmability via the LOST phase transition at around 30° C., while the AA provided the acid groups required for the pH buffer. The polymer had a molecular weight of 25,000 g/mole as determined via GPC in THF. The composition and acrylic acid content of the polymer (i.e., the 90:10 ratio of NIPAM to AA) were verified using NMR spectroscopy and acid-base titrations. The 90:10 P(NIPAM-AA) has a molecular weight of 1080 g/mole per AA, which corresponds to roughly 23 PAA groups per each 25,000 g/mole chain.

To determine the maximum capacity of the pH buffer, increasing amounts of the polymer were dissolved in water at room temperature until the solution became viscous relative to bulk water. Above the phase transition, the PNIPAM-PAA solutions became hard to stir for solids loadings exceeding 5 wt %, which corresponds to a total buffer capacity of $4.6 \times 10^{-2}$ M. All experiments described herein were performed at a solids loading of 1 or 1.08 wt % ($9.3 \times 10^{-3}$ M or $10^{-2}$ M in AA, respectively), where solution viscosities were comparable to that of water. To put this buffer capacity into perspective, the standard phosphate buffer systems PBS (1×) used for biochemical investigations has a total phosphate concentration of 0.01 M.

Various strategies can be deployed if a buffer capacity greater than $10^{-2}$ M is desired: 1) If viscosity is not a serious problem for the process under consideration, the capacity can be increased by a factor of 5 by utilizing higher solution concentrations. 2) The mole fraction of acid groups on the polymer can be increased. However, as will be shown below, increasing the acid content does not necessarily increase the usable capacity of the polymer. 3) The polymer can be attached to a support rather than being left free floating in solution. This latter strategy may seem counter-intuitive, as the support occupies volume that does not contain any acid groups. However, the maximum polymer concentration that is practical in solution is limited by the chain overlap concentration (c*) above which the viscosity rapidly increases. For highly swollen P(NIPAM-AA) chains, c* is estimated to be 2 wt % based on a measured radius of gyration ($R_g$) of 8 nm for 25,000 molecular weight chains.

See I. Noda et al., *Macromolecules* 14 (3), 668 (1981). By tethering chains to a surface, polymer concentrations are no longer limited by c*, but by the packing density of the tethered chains, which can be as high as 5 chains/nm². Therefore, high polymer concentrations at particle surfaces can be achieved while retaining low viscosity, polymer-free areas between the particles. Experiments we have conducted on PNIPAM surfactants inserted into lipid bilayers suggest that P(NIPAM-AA) concentrations of up to 0.1 M should be achievable for the polymer tethered to high surface area silica supports. These experiments also show that tethered PNIPAM still undergoes a hydrophilic-to-hydrophobic phase transition at the expected LOST, although the volume change associated with the transition is clearly suppressed at high packing densities. A buffer concentration of 0.1 M likely represents the upper limit for what can be achieved with programmable buffer systems based on polymers that exhibit LOST behavior. However, all of this capacity may not be available depending on the process within which the buffer system is deployed.

Programming pH and $pK_a$

Figure 4A:
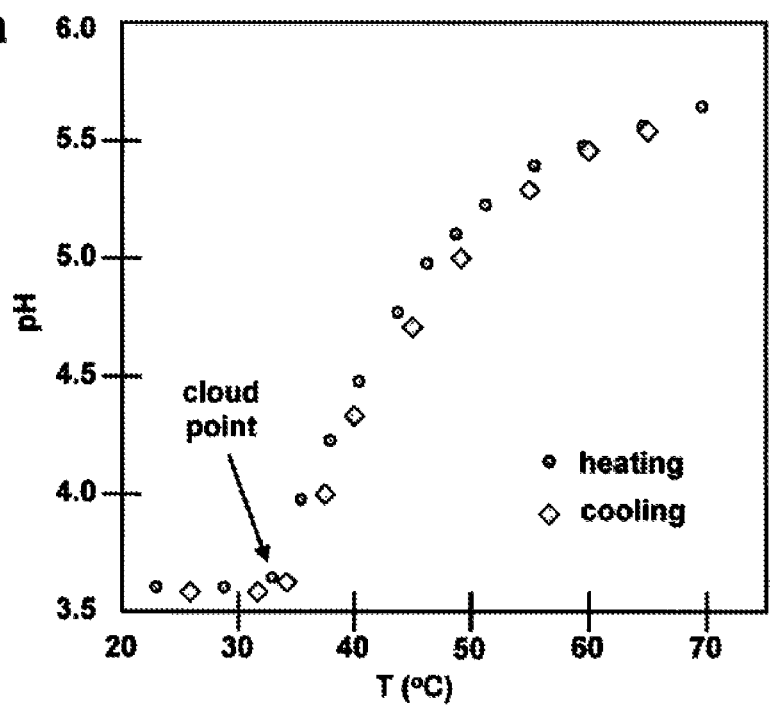
FIG. 4a) is a graph of solution pH values as a function of temperature on heating (red circles) and cooling (blue diamonds) a solution containing a $10^{-2}$ M solution of acid groups on dissolved P(NIPAM-AA) (1.08 wt %). The cloud point for the solution is at 34° C.

The $pK_a$ of the fully protonated P(NIPAM-AA) polymer was determined as a function of temperature in simple experiments in which the pH of solutions that were $10^{-2}$ M in PAA groups from room temperature (22° C.) up to 70° C. were monitored, as shown in FIG. 4a). At 22° C., the solution pH was 3.6, corresponding to $[H^+]=[A^-]=2.5\times10^{-4}$M, where $[A^-]$ represents the concentration of carboxylic acid sites on the polymer. As the temperature was increased, this pH did not change much until around 32° C. Between this temperature and 35° C., the appearance of the solution went from clear to cloudy indicating that 32° C. corresponds to the LCST (also referred to as the "cloud point") for the 90:10 P(NIPAM-AA) polymer. Above 33° C., the pH increased with temperature, with the slope of the pH vs. T curve being steepest right above the transition temperature. However, the pH continued to increase up to the maximum temperature examined of 70° C. On cooling, the pH vs. T curve retraced itself with very little hysteresis, with the polymer redissolving and the solution clarifying below 32° C. as expected. Heating and cooling was conducted multiple times with no apparent loss in activity, showing that the behavior of the buffer is reversible and reproducible.

Figure 4B:
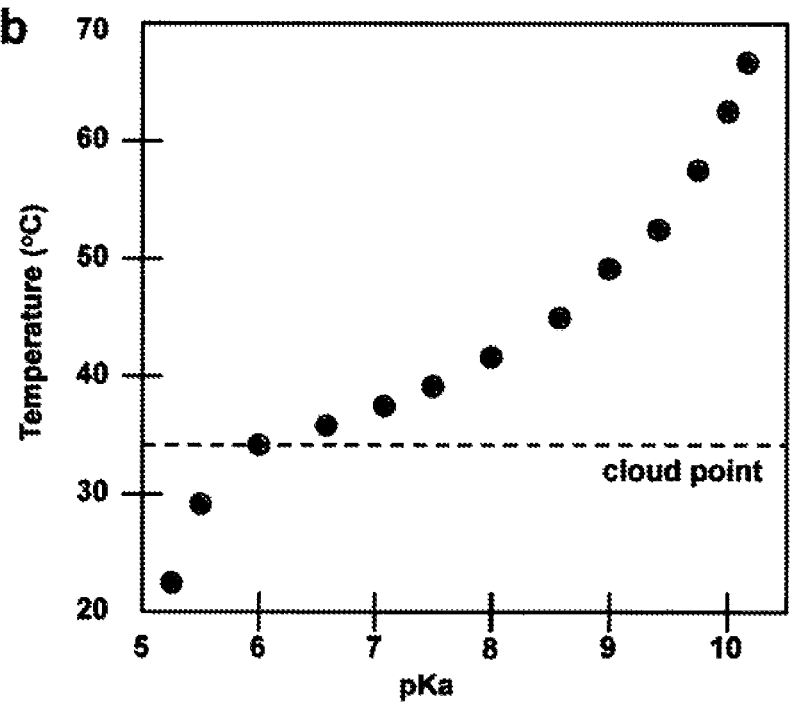
FIG. 4b) is a graph of $pK_a$ of acrylic acid groups on P(NIPAM-AA) as a function of T calculated from the data shown in FIG. 4a).

The $pK_a$ of the polymer shown in FIG. 4b) was calculated from the data shown in FIG. 4a) using Eq. 1. At room temperature, the $pK_a$ is 5.2. This value is slightly higher than that of acrylic acid (4.3), but is well within the range expected for carboxylic acids attached to hydrocarbon chains (e.g. $pK_a$=4.9 for octanoic acid). As the temperature increases, the $pK_a$ shows dramatic increases, reaching a value of 10.4 at 70° C. This change in the acid dissociation constant by a factor of over $3\times10^5$ validates the utility of hydrophilic-hydrophobic switching to program buffer behavior. However, while much of this increase occurs within 10° C. of the transition temperature, the $pK_a$ continues to increase as far above the transition as was investigated. The results are consistent with the hypothesis that the polymer continues to collapse above the LCST, becoming more hydrophobic as more water is expelled from the polymer. An indirect measure of the PNIPAM densification is that if the polymer is left at 70° C. for an extended period of time (e.g., half a day), the pH vs. T cooling curve starts to exhibit hysteresis, and the polymer does not instantly re-dissolve below the transition temperature (although dissolution does eventually occur). (In a 1 wt % solution, the extent of hysteresis and the time required for redissolution are negligible if the polymer is held at 50° C.) These results suggest that if the polymer is held at high temperature for too long, rehydration of the densified polymer is inhibited, resulting in a slower phase transition.

Coupling of Buffer Capacity and Programmable Properties

In the experiments described above, anion formation on the polymer buffer was established via the dissociation of the AA sites. The resulting anion concentration on the polymer at room temperature ($[A^-]=2.5\times10^{-4}$ M) represents only 2.5% of the total acid sites present. At 70° C., the anion content is negligible ($6\times10^{-7}$ M). Further experiments were conducted to explore the behavior of the polymer as a function of polymer ionization by adding NaOH to the solutions to neutralize a fraction of the AA groups and set the initial [HA]/[A] ratio of the polymer. These experiments were done for two reasons: 1) to explore how much of the proton capacity of the pH buffer can be used, and 2) to determine the range of solution pH values that the polymer buffer can generate. For example, if one could start with the totally anionic form of the polymer ($[A^-]=10^{-2}$ M), then the polymer would capture rather than release protons via the reaction:

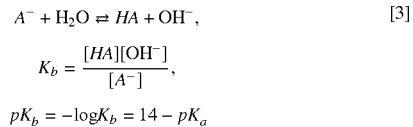

$$A^- + H_2O \rightleftharpoons HA + OH^-,\quad [3]$$

$$K_b = \frac{[HA][OH^-]}{[A^-]},$$

$$pK_b = -\log K_b = 14 - pK_a$$

If the $pK_a$ values shown in FIG. 4b) for the "native" polymer apply, a $10^{-2}$ M solution of the fully anionic polymer can in principle be capable of generating solution pH values as high as pH 11.2 at 70° C. dropping to pH 8.5 at room temperature. This means that with the combination of programming and partial neutralization, this single polymer can be capable of generating pH values ranging from 3.5 to 11.2.

Figure 5:
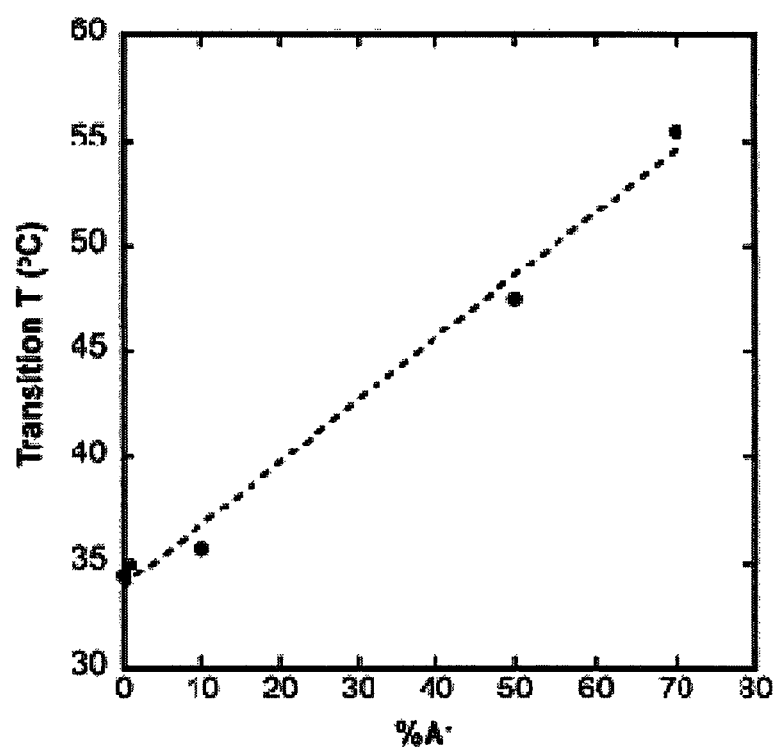
FIG. 5 is a graph of transition temperature or cloud point for P(NIPAM-AA) based on the mole percent of acrylic acid anion (A$^-$) in the 90 mole % N-isopropyacrylamide and 10 mole % acrylic acid copolymer.

A series of tests were conducted to determine the transition behavior as a function of the degree of polymer ionization. Multiple solutions with different ratios of [HA]/[A−] were prepared by partially neutralizing a 1 wt % P(NIPAM-AA) solution with 0.1 M NaOH. First, the transition temperature was determined vs. [HA]/[A] by monitoring the solution cloud point upon slowly heating well-mixed solutions. FIG. 5 shows that there is a systematic increase in the transition temperature with the degree of ionization of the polymer. This increase arises due to the fact that while protonated AA is relatively hydrophobic, the anionic form generates local charges that increase the hydrophilic character of the polymer. It has been shown that systematic substitutions of hydrophobic or hydrophilic peptides within the polypeptide elastin result in similar variations in the transition temperature. See D. W. Urry, *Angew Chem Int Edit* 32 (6), 819 (1993). Hydrophilic substitutions lead to increases in the transition temperature, while hydrophobic substitutions result in transition temperature decreases. The slope of the transition temperature vs. $[A^-]$ curve is similar to that reported by Urry on elastin, and is also consistent with the limited literature reports on the behavior of P(NIPAM-AA) copolymers. See D. W. Urry, *Angew Chem Int Edit* 32 (6), 819 (1993); and J. C. Kim, *J Biochem-Tokyo* 121 (1), 15 (1997). The consequences of the increase in transition temperature with increases in [A−] are: 1) more thermal energy is required to program the polymer, and 2) the change in $pK_a$ with temperature is suppressed as more and more of the capacity of the buffer is utilized.

Figure 6:
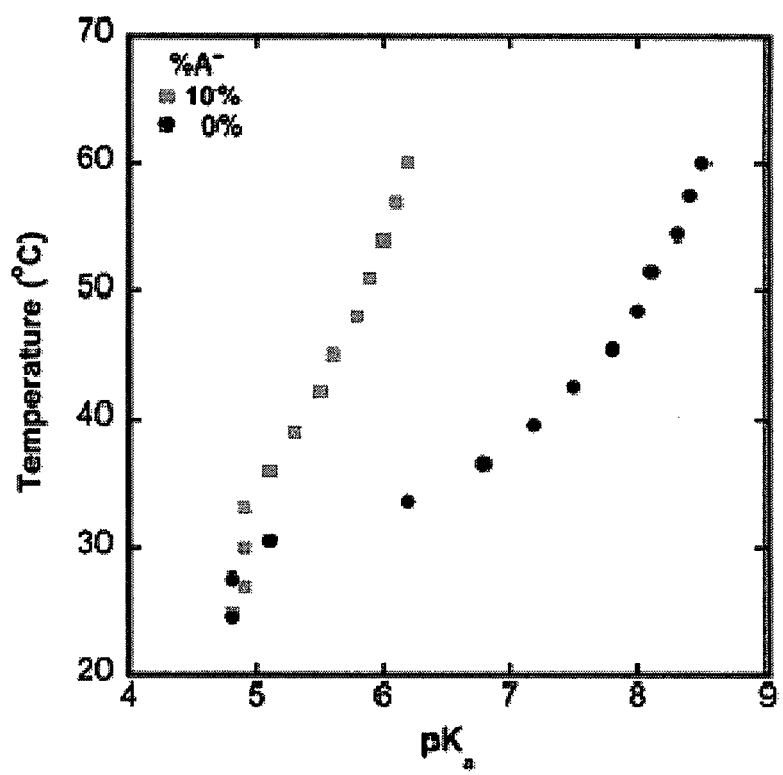
FIG. 6 is a graph of $pK_a$ of P(NIPAM-AA) as a function of temperature and as a function of the degree of polymer ionization. For example, as P(NIPAM-AA) contains 10 mole % of acrylic acid groups, the curve for A$^-$=10% represents a polymer containing 2.5 mole % A$^-$ and 7.5 mole % HA.
Figure 7:
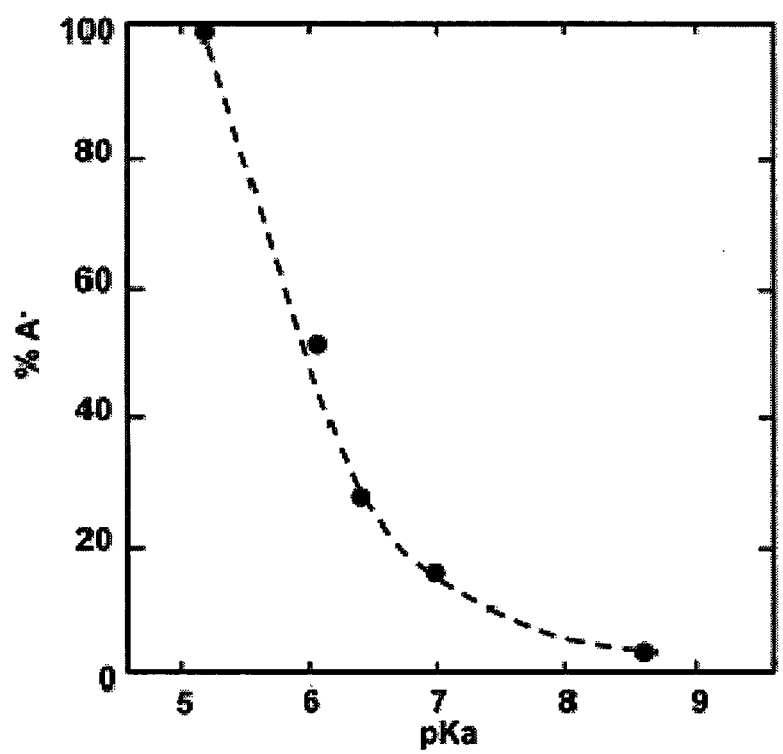
FIG. 7 is a graph of $pK_a$ of P(NIPAM-AA) at 60° C. as a function of the degree of ionization of the acrylic acid groups. As the $pK_a$ at room temperature (below the LCST phase transition temperature) is 5.2, the results show that the magnitude of the $pK_a$ shift with temperature decreases as the anion content of the polymer increases.

Changes in the transition temperature and $pK_a$ response of the buffer were examined in more detail by performing a series of experiments to monitor pH vs. T as a function of the initial anion content of the polymer. Again, the anion content was set by neutralizing a fraction of the AA groups on 1 wt % P(NIPAM-AA) solutions using 0.1 M NaOH. FIG. 6 shows that while the $pK_a$ below the transition temperature is relatively insensitive to [A−]/[HA] ratio, the increased hydrophilicity of the polymer associated with AA ionization suppresses $pK_a$ changes above the transition temperature. For example, the polymer in which 15% of the available AA groups have been deprotonated to make A− has a $pK_a$ at 60° C. of 6.8, which is significantly lower than the value of 9.7 measured for the pure [HA] form. A plot of the high temperature $pK_a$ vs. [A−] in FIG. 7 shows that the impact of ionization on $pK_a$ is most pronounced at relatively low degrees of ionization. This indicates that the presence of even fairly low A− concentrations is sufficient to inhibit the extent of the PNIPAM collapse to create a hydrophobic internal environment above the transition temperature.

Design Criteria for Programmable pH Buffers

The major consequences of the impact of buffer ionization on suppressing the phase transition in the P(NIPAM-AA) system involve trade-offs between the buffer capacity, the $pK_a$ range that can be accessed, buffer reversibility, and the transition temperature. Design criteria for implementing polymer buffer systems based on our results are discussed below for specific targeted properties:

Large, Reversible $pK_a$ Changes:

If the desire is to move from high pH to low pH by lowering the temperature, P(NIPAM-AA) can promote large changes at a high buffer capacity (as high as 0.1 M). However, if much of this buffer capacity is utilized, this transition is not reversible due to the creation of high concentrations of bound A− anions. If a robust, low temperature transition is desired that reversibly provides a maximum shift in $pK_a$ values, P(NIPAM-AA) can provide the desired performance at lower buffer capacities. The important parameter that controls performance is the total anion content on the polymer rather than the degree of ionization ([HA]/[A−]). This means is that for reversible systems, the buffer capacity cannot be increased by increasing the AA content of the polymer, as polymer performance undergoes significant changes once [A−] exceeds around 0.5% of all monomer sites (NIPAM+AA). Regardless of the AA content of the P(NIPAM-AA) system, the maximum buffer capacity for a reversible system (for a tethered polymer with an AA concentration of 0.1 M) is limited to around $5 \times 10^{-4}$ M.

Effective pH Window:

If the goal is to use the P(NIPAM-AA) buffer to adjust pH values in the acidic pH regime, the 90:10 system studied here will be completely functional provided that the degree of ionization (i.e., the conjugate base content) of the dissolved polymer is kept below 0.5 mole % of all monomers in the polymer chain (NIPAM+AA)(i.e., while the mole fraction of AA in the polymer can be high and variable, the A− mole fraction must be kept low). If the goal is to adjust the pH within the basic regime (as in Eq. 3), essentially all HA must be neutralized to form A−, which means that the total acid group content of the polymer (HA+A−) must be kept below 0.5 mole %.

Switching Temperature:

The higher the transition temperature is, the more modest $pK_a$ changes with temperature will be. This is because high transition temperatures go hand in hand with more hydrophilic polymers that induce less of a change in local hydrophobicity above the transition temperature. This means that polymers having an LOST of 30° C. and below should be utilized if large changes in $pK_a$ are desired. For the exemplary P(NIPAM-AA) composition tested here, $pK_a$ changes are less than 1 $pK_a$ unit for compositions ([HA/[A−]) that result in transition temperatures above 70° C.

Compositional Tuning:

The performance of reversible LOST pH buffers can be altered by deliberately adding more hydrophobic components to the system. The elastin system shows that: 1) The slope of the transition temperature vs. A− curve depends on what the acid is. For example, the increase in transition temperature with A− for aspartic acid is reported to be only two thirds of the slope seen for glutamic acid. 2) The addition of hydrophobic groups lowers the transition temperature. See J. C. Kim, *J Biochem-Tokyo* 121 (1), 15 (1997). Hydrophobic groups can be added to LOST polymers such as P(NIPAM-AA) to offset some of the hydrophilicity increases imposed by buffer ionization.

Figure 8:
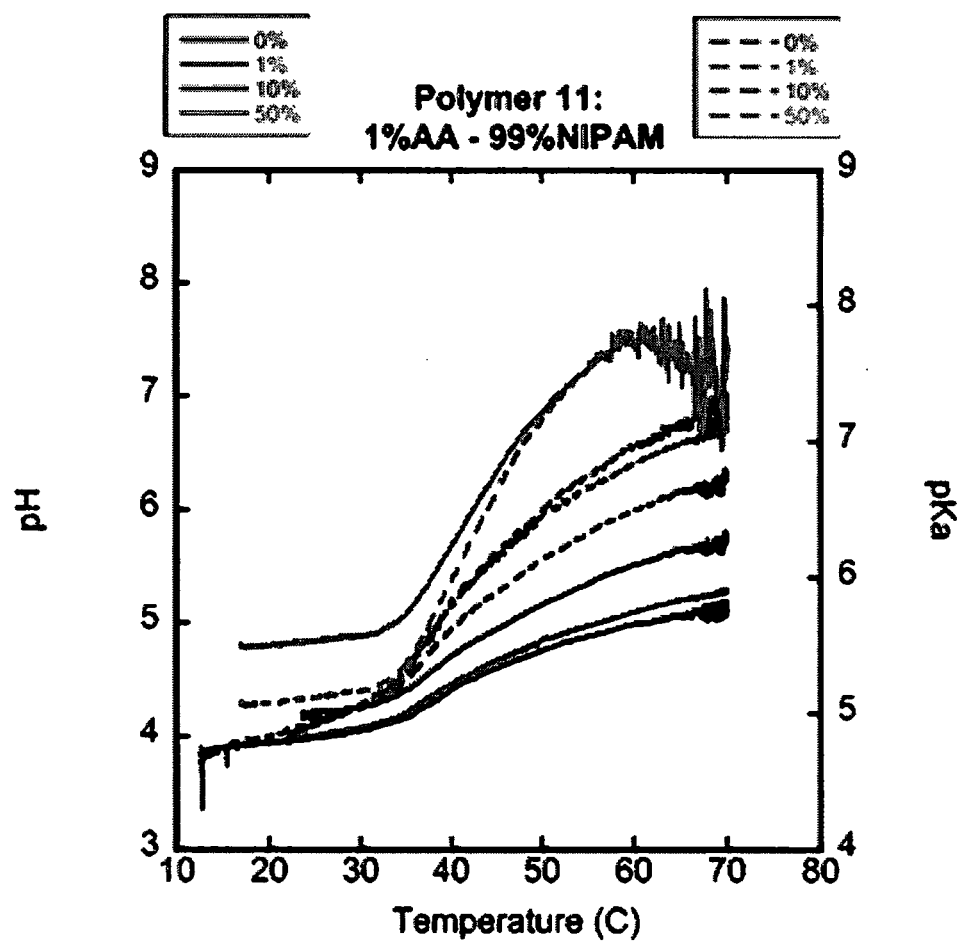
FIG. 8 is a graph of pH (solid lines) and $pK_a$ (dashed lines) measured as a function of temperature for a copolymer containing 1 mole % acrylic acid in 99 mole % NIPAM.

FIG. 8 is a graph of pH (solid lines) and $pK_a$ (dashed lines) response to changing temperature as a function of ionization. Altering the acid content to 1 mole % (versus 99 mole % NIPAM) allows a great degree of freedom in the pH and pKa responses to temperature.

Figure 9:
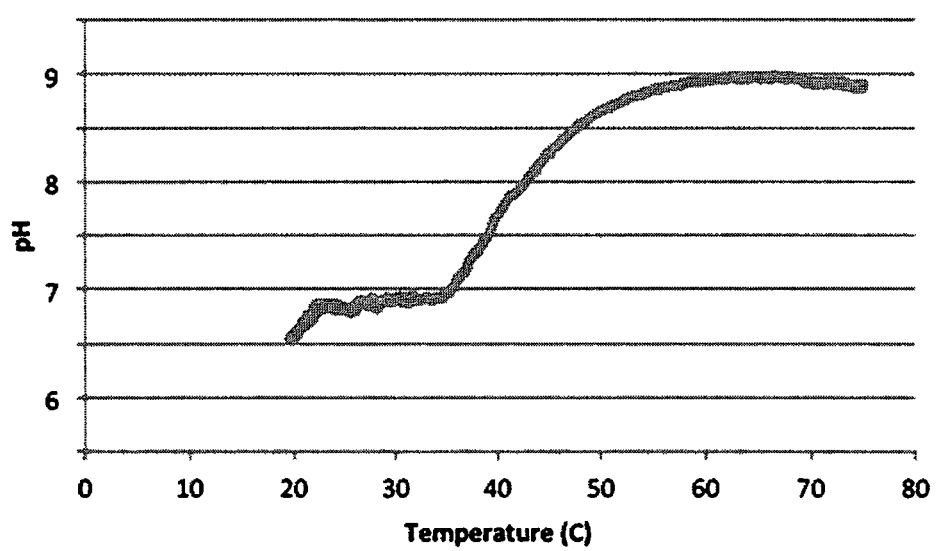
FIG. 9 is a graph of pH versus temperature for a copolymer containing 1 mole % acrylic acid in 99 mole % NIPAM around neutral pH (all acid sites deprotonated).

FIG. 9 is a graph of pH as a function of temperature for the copolymer containing 1 mole % AA and 99 mole % NIPAM with the initial pH adjusted to >6 (100% ionization). This figure demonstrates the flexibility of the thermally programmable buffer system (buffering the solution pH around neutral). This flexibility can be used to control the behavior of enzymes found in mammals (body pH is typically ~7.4).

FIGS. 8 and 9 demonstrate that 1 mole % AA copolymer shows buffering at acidic, neutral and basic pH ranges. The neutral pH shifting is important because the way nature brings $CO_2$ into and out of aqueous environments is based on an enzyme called carbonic anhydrase. Carbonic anhydrase works well converting $CO_2$ to $H_2CO_3$ when the pH is above ~7-7.5. However, the pH buffer is necessary to deprotonate the $H_2CO_3$ such that $CO_2$-species can be stored in water. Without the buffer, the solution pH would decrease as the $H_2CO_3$ content increased, inactivating the carbonic anhydrase, and releasing $CO_2$.

Figure 10:
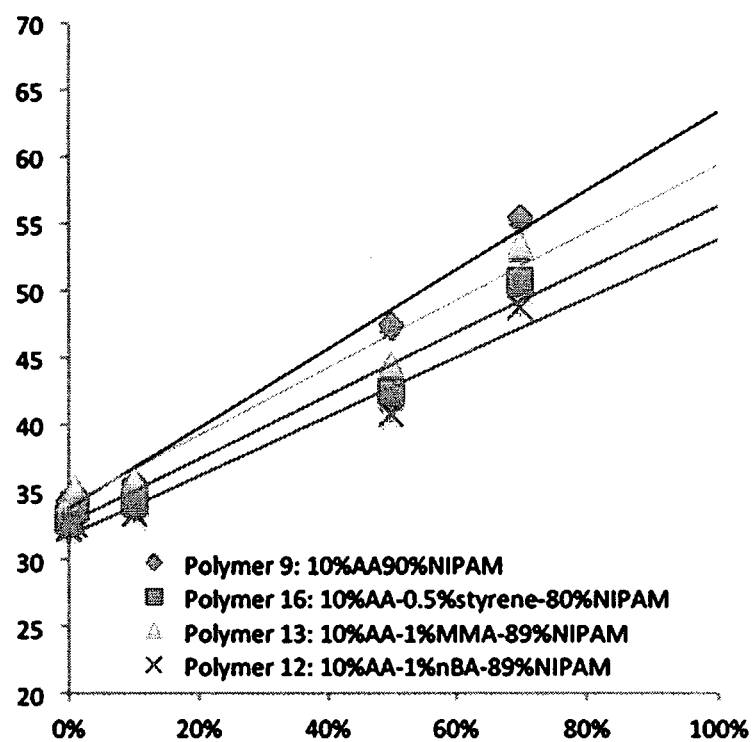
FIG. 10 is a graph of transition temperature as a function of ionization of acid groups for various copolymers.

FIG. 10 is a graph of transition temperature as a function of ionization of the original 10 mole % AA copolymer compared to copolymers containing up to 1 mole % styrene, methyl methacrylate (MMA), and n-butyl acrylate (nBA). The Initial transition temperatures at 0% ionization are similar for all the copolymers. The transition temperatures of the copolymers increase with increasing hydrophilicity of the copolymers (from most hydrophilic to least: 0% additive, 1% MMA, 0.5% styrene, 1% nBA, at all ionization values 10, 50 and 70%). This figure shows how small amounts of the hydrophobic monomers control the copolymer behavior.

The present invention has been described as programmable pH buffers that can be used for reversible $CO_2$ sequestration in water. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for $CO_2$ sequestration into water, comprising:
dissolving a programmable pH buffer in water thereby providing an aqueous solution, wherein the programmable pH buffer comprises a copolymer that changes $pK_a$ at a lower critical solution temperature in water, and wherein the copolymer comprises a thermally programmable polymer that undergoes a hydrophobic-to-hydrophilic phase change at the lower critical temperature and an electrolytic polymer that exhibits acid-base properties that are responsive to the phase change, and
heating the aqueous solution above the lower critical solution temperature, wherein the copolymer changes from a high $pK_a$ in water below the lower critical solution temperature to a low $pK_a$ in water above the lower critical solution temperature, thereby releasing $CO_2$ into water upon heating the aqueous solution above the lower critical solution temperature.

2. A method for changing solution pH, comprising:
dissolving a programmable pH buffer in water thereby providing an aqueous solution, wherein the programmable pH buffer comprises a copolymer that changes $pK_a$ at a lower critical solution temperature in water, and wherein the copolymer comprises a thermally programmable polymer that undergoes a hydrophobic-to-hydrophilic phase change at the lower critical temperature and an electrolytic polymer that exhibits acid-base properties that are responsive to the phase change, and wherein the copolymer has a buffer capacity of greater than 1 mM in aqueous solution, and
heating the aqueous solution above or cooling the aqueous solution below the lower critical solution temperature, thereby changing the pH of the aqueous solution.

3. The method of claim 2, wherein the electrolytic polymer comprises an acid.

4. The method of claim 3, wherein the acid comprises acrylic acid.

5. The method of claim 2, wherein the electrolytic polymer comprises an amine.

6. The method of claim 5, wherein the amine comprises a primary amine.

7. The method of claim 6, wherein the primary amine comprises N-(3-aminopropyl)methacrylamide hydrochloride.

8. The method of claim 2, wherein the copolymer further comprises a hydrophobic monomer.

9. The method of claim 8, wherein the hydrophobic monomer comprises methylmethacrylate, styrene, or n-butyl acrylate.

10. A method for $CO_2$ sequestration into water, comprising:
dissolving a programmable pH buffer in water thereby providing an aqueous solution, wherein the programmable pH buffer comprises a copolymer that changes $pK_a$ at a lower critical solution temperature in water, and wherein the copolymer comprises a thermally programmable polymer that undergoes a hydrophobic-to-hydrophilic phase change at the lower critical temperature and an electrolytic polymer that exhibits acid-base properties that are responsive to the phase change, and
heating the aqueous solution above the lower critical solution temperature, wherein the electrolytic polymer comprises a carboxylic acid group that captures $CO_2(g)$ from water above the lower critical solution temperature by converting carbonic acid ($H_2CO_3$) to bicarbonate anion ($HCO_{3-}$).

11. The method of claim 10, further comprising cooling the aqueous solution below the lower critical solution temperature, whereby the copolymer releases $CO_2$ into water.

12. The method of claim 1, 2, or 10, wherein the lower critical solution temperature is greater than 20° C. and less than 50° C.

13. The method of claim 1, 2, or 10, wherein the thermally programmable polymer comprises poly(N-isopropylacrylamide), poly(N-ethylacrylamide) or poly(N,N-dimethylacrylamide).

* * * * *